March 17, 1942.  C. E. HATHORN  2,276,391
STRUCTURAL JOINT
Filed April 6, 1940

INVENTOR
CHARLES E. HATHORN.
BY
ATTORNEY

Patented Mar. 17, 1942

2,276,391

UNITED STATES PATENT OFFICE 2,276,391

STRUCTURAL JOINT

Charles E. Hathorn, Kenmore, N. Y., assignor to Curtiss-Wright Corporation, a corporation of Delaware Application April 6, 1940, Serial No. 328,287

3 Claims. (Cl. 189—36)

This invention relates to structural joints and is concerned in particular with a mode of attaching crossing structural members to one another.

An object of the invention is to provide a cross connection for a pair of angle members or the like where one of the members comprises a main support and the other an auxiliary element. In particular, the invention provides a convenient means for attaching aircraft ribs or fairing members to spars, where the fairing members are considerably lighter than the spars and where it is desired to have the open face of the fairing members as closely spaced as is consistent with strength to the face of the spar member.

A further object of the invention is to provide a structural connection in which no extraneous fittings need be used, the elements themselves providing the necessary structure for the joint.

The details of the invention will be appreciated in reading the description below in connection with the drawing, in which.

Figure 1:
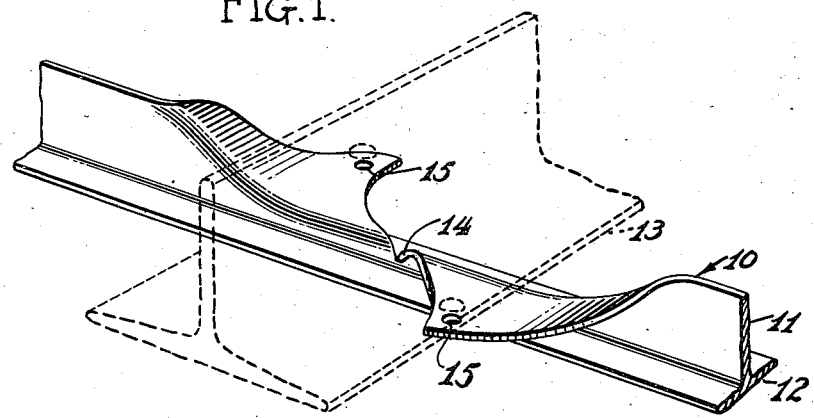
Fig. 1 shows a T member formed according to the invention and showing its relationship to a support member the latter being shown in dotted lines.

A rib or fairing element 10 is shown in the figures as a T section comprising a web 11 and a flange 12. In a portion of the length of the member 10 which is desired to be joined to a crossing element such as a large T member 13 shown in dotted lines in Fig. 1, the web 11 is split or slotted from its free edge nearly to the flange 12, and the web portions adjacent the slit 14 are bent down on opposite sides of the plane of symmetry of the member 10 so that the faces of the web 11 adjacent the slit 14 are parallel to the flange 12 to provide a flat seat to receive the flat flange of the member 13. Said flange is appropriately drilled to match drillings 15 formed in the bent portions of the web 11 so that the two members may be secured to one another by rivets or screws, rivets 16 being shown in Figs. 2 and 3.

Figure 3:
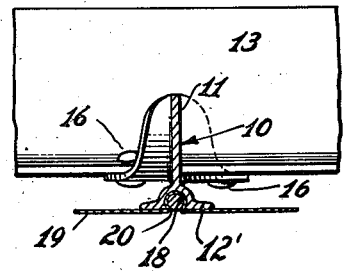
Fig. 3 is a section taken through a fairing element of different form.

In Figs. 3, the flange 12' of the member 10 is shown as having a groove 18 within which a fold of covering fabric 19 is inserted to be secured to the member 11 by a resilient filler strand 20.

Figure 2:
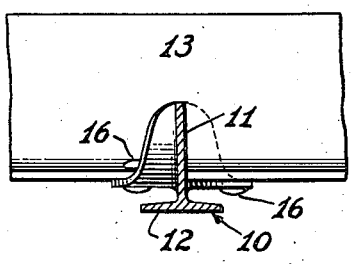
Fig. 2 is a section taken through the fairing element.
Figure 4:
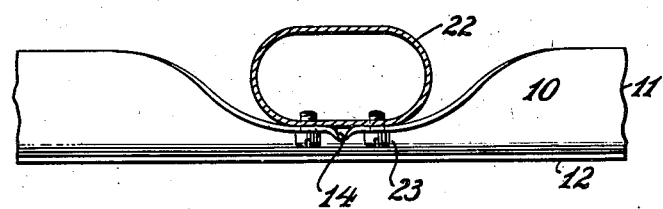
Fig. 4 is a section taken through the main structural member which is shown as a tube.

In Fig. 4, the member 11 is fitted to a tubular member 22, in place of the T member 13 and is secured thereto by screws 23. In Fig. 4, the portions of the web 11 adjacent to the slit 14 are bent to the same side of the normal plane of the web 11, rather than to opposite sides of said plane as shown in Fig. 1.

Whether the web portions be bent to opposite sides of the web plane or to the same side thereof, is a matter of choice depending on the nature of the structure with which the invention is intended to be used.

Where elements such as 13 and 22 are structural members which lie close to the external surface of a body, it is obvious that the fairing strips or ribs such as 10 must be of small thickness where they are secured to structure. Where such members 10 are T sections, they would ordinarily be cut away so that the flange 12 of the member 10 could be secured to the main structural member, such cutting involving careful dressing so that good bearing is obtained between the inside surface of the flange 12 and the structural member. However, by the use of this invention such careful preforming of the components is unnecessary since the cutting and bending of the web 11 as described comprises a simple operation. Also, by the use of the invention the member 10 sacrifices little strength, the sheer strength thereof at the edges of the structural member 13 being equal to the sheer strength in the unaltered regions of the member 10, since no material is removed at this point. Thus, when the main portion of the member 10 acts as a beam supported at both ends by structural members, such beam will have full strength throughout its length without dependence upon extraneous fittings or complex formation of the members involved.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a structural joint, an elongated member comprising a flange and an integral web extending normally from one side thereof, said web having a transverse cut extending from its free edge nearly to but not interrupting the flange, the web portions adjacent said cut being oppositely bent and formed to comprise pads whose portions adjacent the cut are flat, parallel and close to the member flange and whose portions remote from the cut are curved and blended into the web at points spaced from the cut, a second elongated member crossing the first member having a substantially flat face engaging the flat portions of said pads, and means to secure the flat face of the second member to said pads.

2. In a structural joint, an elongated T member having its web parted from its free edge to, but not intersecting, the member flange, the web on opposite sides of the parting being bent to opposite sides of the web plane to comprise mounting pads tapering in width as the bend of the pad extends from the web edge toward the member flange, said bends being curved in profile as viewed from a point to one side of the web and blending into portions, adjacent the parting, which are parallel to and closely adjacent the member flange.

3. A structural joint comprising an elongated T member having its web slit from the free edge toward the flange, the web portions adjacent the slit being oppositely bent to form a pad whose plane is substantially normal to the web plane and parallel to and closely spaced relative to the flange plane, and a second elongated member crossing the first having a flat portion seated on and secured to said pad, the bent web portions adjacent said pad and removed from the slit extending lengthwise of the member and blending along a curved line into the normal part of the web.

CHARLES E. HATHORN.